Jan. 20, 1970  C. R. SARE  3,490,207
DUST COLLECTOR
Filed July 14, 1966  3 Sheets-Sheet 1
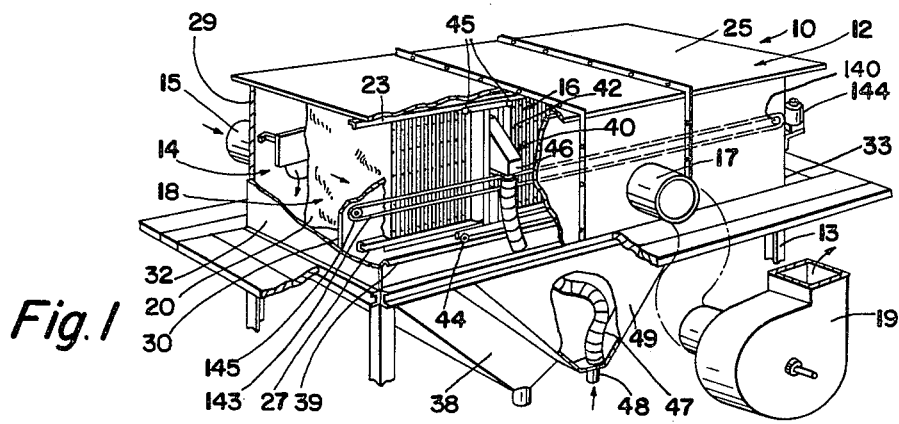
Fig. 1
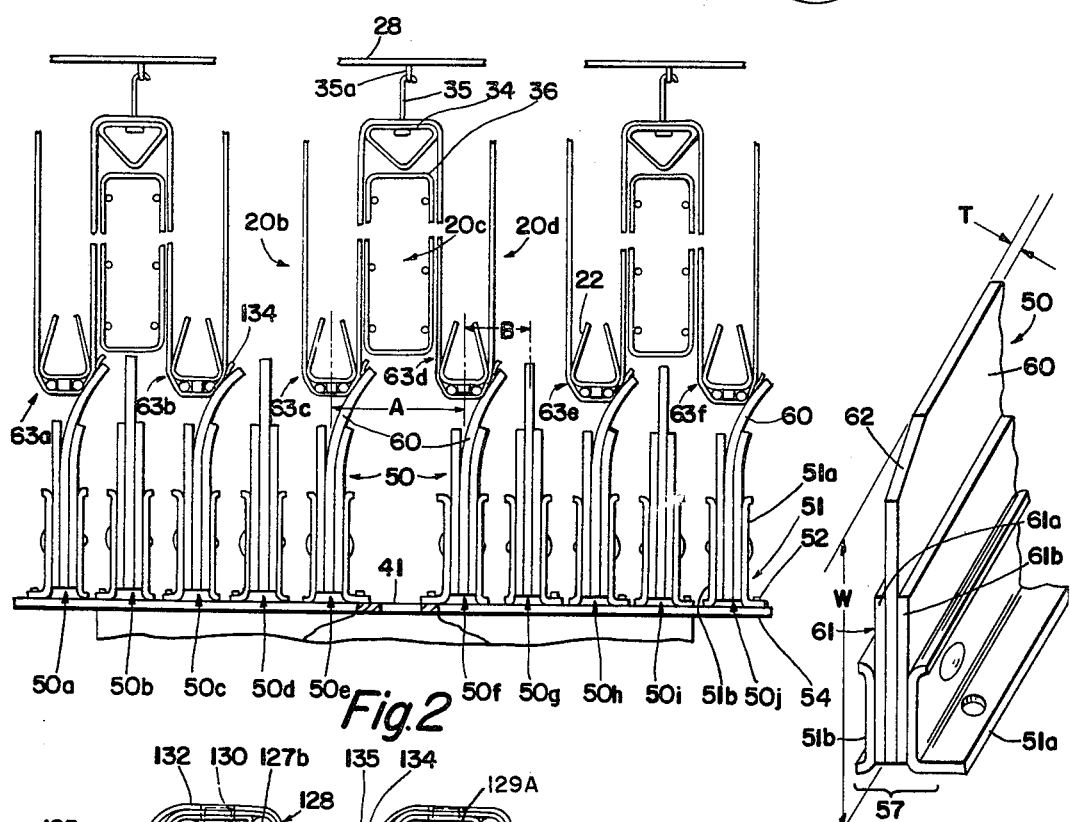
Fig. 2
Fig. 3
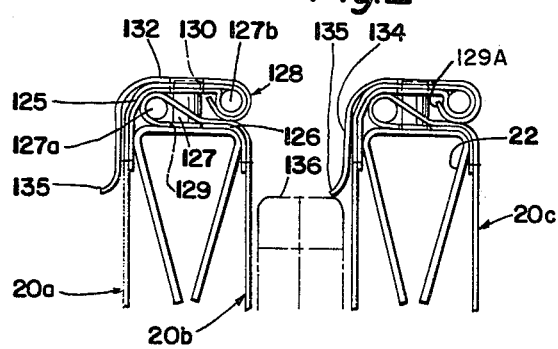
Fig. 8
INVENTOR.
CARL R. SARE
BY
Jeare, Jeare & Sammon
ATTORNEYS

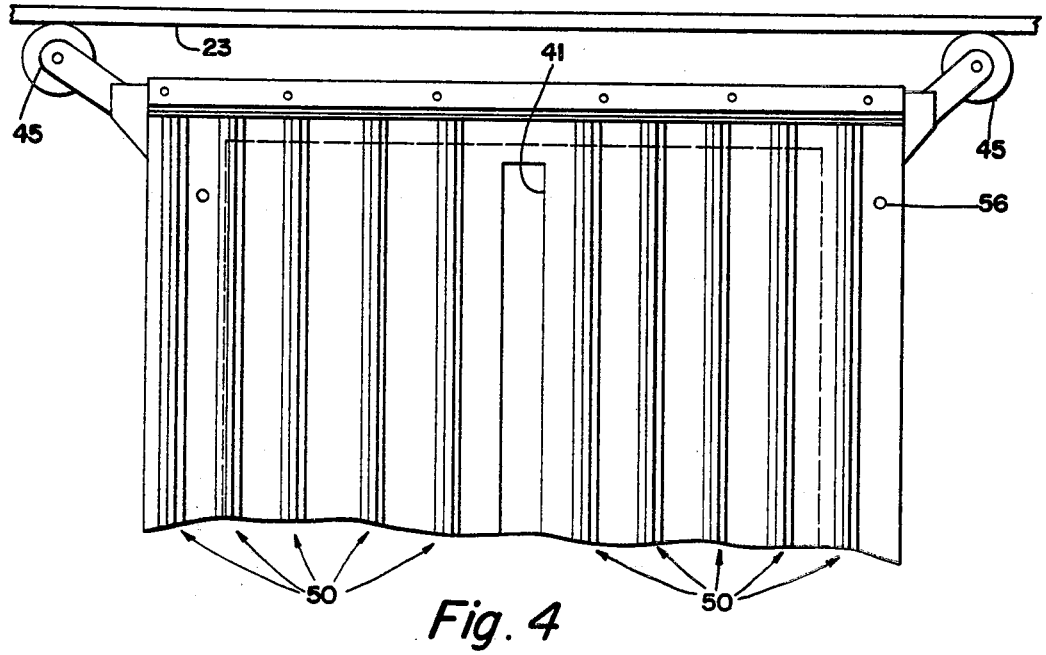
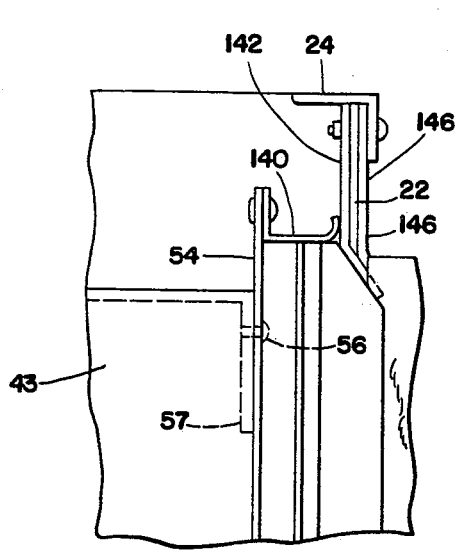
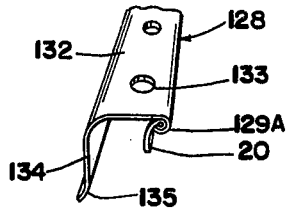
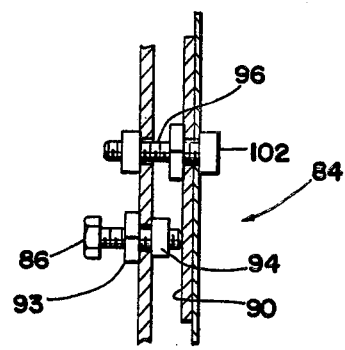

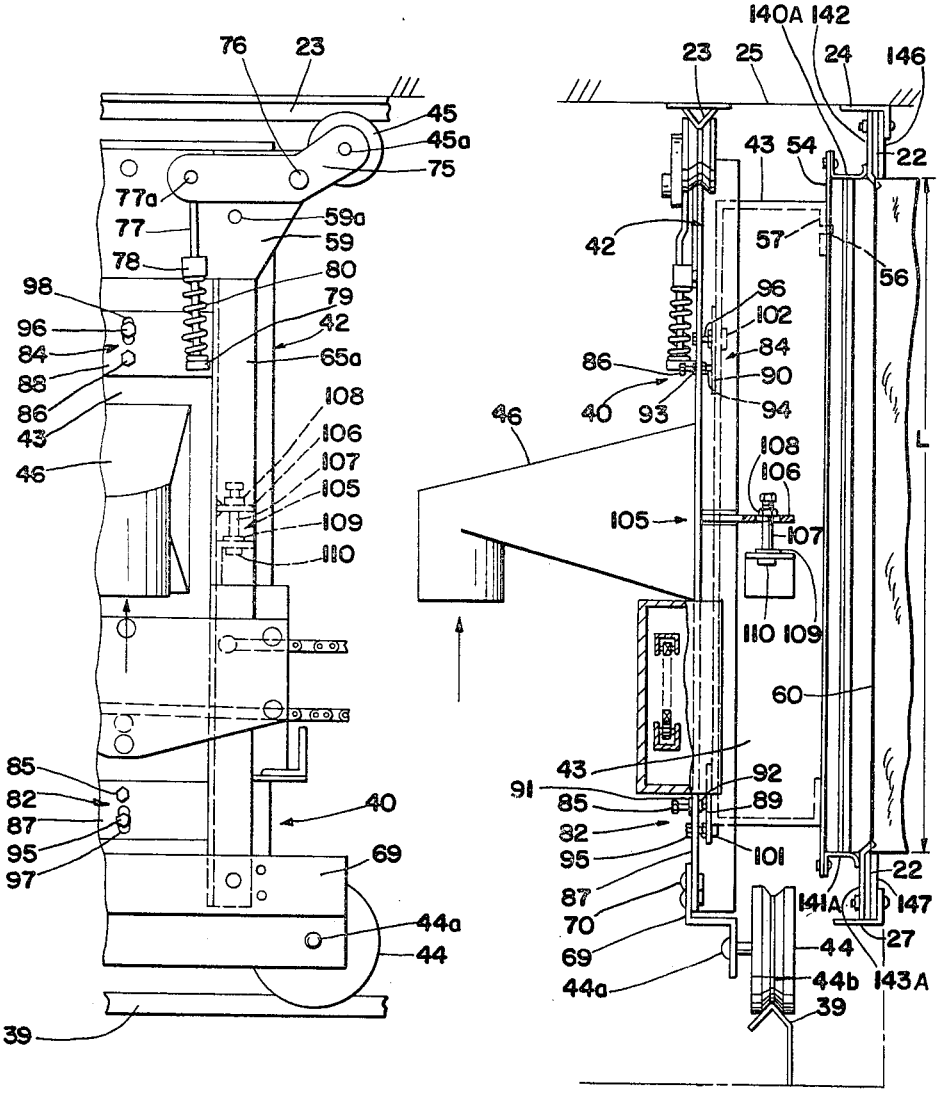

United States Patent Office 3,490,207
Patented Jan. 20, 1970

3,490,207
DUST COLLECTOR
Carl R. Sare, Bay Village, Ohio, assignor to W. W. Sly Manufacturing Company, Cleveland, Ohio, a corporation of Ohio
Filed July 14, 1966, Ser. No. 565,145
Int. Cl. B01d 35/22, 45/18, 46/04
U.S. Cl. 55—294                                      4 Claims

ABSTRACT OF THE DISCLOSURE

A dust collecting apparatus including a dust chamber with a dust wall mounted therein including a plurality of filter bags and a reverse air flow traveler mechanism mounted on the apparatus for selectively cleaning each bag. A plurality of wiper elements are mounted on said traveler whereby the reverse air flow is selectively projected into each bag singly for snap-action cleaning of the bags. The traveler, which is resiliently mounted on rotatable members, is provided with adjustment means for selectively adjusting the horizontal, vertical and angular canting position of the wiper elements with respect to the dust collecting apparatus.

---

The present invention relates to air cleaning apparatus and more particularly to dust collectors of the type which employ fabric bags as filter media for air cleaning purposes or the like.

In operation of the apparatus of the type with which the present invention is concerned, dust-laden air to be cleaned may be admitted into a collector so as to pass through a "dust wall" which may comprise a series of air pervious, but dust impervious fabric type filter bags which collect admitted dust on the exterior surface thereof. To dislodge the dust, a cleaning action may be effected by reverse air caused to flow through the bags in a direction opposite the direction of flow of the dust-laden air entering the collector. The dust dislodged from the exterior surface of the bags may then be discharged into a hopper and removed from the system.

The reverse air flow for cleaning the bags has been accomplished by a traveler mechanism one form of which has generally included a pair of flexible rollers disposed on either side of a reverse air nozzle. In operation, the traveler moves progressively along the open ends of the bags and in a manner to direct a reverse air flow into the bag to be cleaned. The flexible rollers overlapped one or more of the bags on either side of the bag to be cleaned, thereby sealing off the bag being cleaned from the adjacent bags so as to direct the reverse flow air only into the bag which is directly opposite the reverse air nozzle.

It is desirable to keep the traveler constantly moving at a relatively slow speed in order to allow sufficient reverse flow air to pass into the bag to be cleaned. Since the rollers are required to be of a relatively large diameter in order to overlap the adjacent bag openings the seal is made and broken relatively slowly. As a result, the build-up of air in the bag to be cleaned was relatively sluggish. Therefore, the operation was lacking in the kind of flexing which would "shake" the bag with a kind of "snap" to assist in removal of the dust. In addition, the roller elements had other disadvantages such as being difficult to remove for replacement or repair, and requiring expensive auxiliary attachments. Moreover, due to their necessary soft character to allow for the compression which provided the overlapping, the rollers were subject to relatively rapid wear.

Accordingly, an object of the present invention is to overcome the aforementioned disadvantages of the prior traveler assemblies by providing a sealing device having rapid seal making and breaking characteristics which will give an improved flexing to the bag to produce a "snap" action to assist in removal of the dust; which will reduce the need for auxiliary equipment; which will have a longer wear life; which can be readily removed for replacement and/or repair, and wherein the state of wear can be readily observed.

Other objects and advantages of the present invention will be apparent from the following description taken in conjunction with the accompanying drawings, wherein:

FIG. 1 is a perspective view, partly broken away, of a dust collecting apparatus which may be employed in the present invention;

FIG. 2 is an enlarged fragmentary top plan view, partly in section, showing the novel sealing device of the present invention in sealing engagement with a portion of the dust wall;

FIG. 3 is an enlarged fragmentary perspective view of one of the novel sealing members of the present invention and shown removed from the assembly;

FIG. 4 is a fragmentary view of the front of the traveler having a plurality of novel sealing elements mounted thereon;

FIG. 5 is a fragmentary rear elevation view of the traveler mechanism in operative position opposite the dust wall;

FIG. 6 is a fragmentary side elevation view of the traveler mechanism of FIG. 5 in operative position adjacent the dust wall; and FIG. 7 is an enlarged fragmentary view of the top portion of one of the sealing blocks in engagement with the dust wall;

FIG. 8 is an enlarged fragmentary view of a portion of FIG. 2;

FIG. 9 is a fragmentary perspective view of a fastening and sealing member attached to one end flap of a bag; and FIG. 10 is an enlarged fragmentary section view of one of the adjustable locking assemblies of the invention.

In general, and with reference again to the drawings, FIG. 1 shows a dust collecting apparatus, designated generally at 10, having a multi-section housing 12 mounted on a frame 13. The housing 12 may be constructed to include any number of sections dependent upon the volume of air to be processed. As shown, the housing 12 may include a dust-laden air chamber 14, and a clean air chamber 16 which may be separated by a dust wall, designated generally at 18. Dust-laden air may be admitted through a pipe 15 and clean air discharged through a pipe 17. The flow of air through the apparatus is indicated by the arrows in FIG. 1 and may be propelled through the apparatus by a suitable motor driven blower 19.

The dust wall 18 may include a plurality of fabric type dust collecting bags 20 which may be of an open construction at their front ends adjacent the clean air chamber 16. The bags 20 may be attached at their front ends to and fed between a plurality of mullions 22 (FIG. 2) which may be vertically mounted, as shown in FIG. 6, in laterally spaced relationship between a top horizontal angle bar 24, which may be fastened to a top wall 25 of the housing 12 and a bottom horizontal angle bar 27, which may be mounted on the bottom or base of the housing 12. The bags 20 may extend into the dust-laden air compartment 14 and may be attached as by hooks 35 and eyes 35a at their rear ends to a horizontal bracket 28 which projects from the rear wall 29 of the housing 12. Partitions 30 (only one shown) may extend from the side walls 32 and 33, respectively, of the housing 12 so as to be sealed with the mullions 22 in a manner as known in the art. By this arrangement, the bags 20 together with the partitions 30 provide a dust impervious barrier which is operative to separate dust-laden air chamber 14 from the clean air chamber 16.

To prevent the bags 20 from collapsing during the ordinary dust collecting operation, each bag may include one or more internal spacer elements 36 (FIG. 2) comprised of a resilient material, such as wire or the like. Any number of spacers may be provided dependent upon the desired bag size. Moreover, the dust dislodged from the exterior surface of the respective bag 20 may be deposited in a hopper 38 (FIG. 1) for removal from the system, as desired.

To achieve reverse air flow, a traveler mechanism 40 including a frame 42 having wheels 44 and 45 may be disposed for movement on oppositely disposed horizontally disposed bars 23 and 39 which provide track ways for rolling engagement of the wheels 44 and 45 thereon. The traveler 40 is continually propelled along the tracks (by means later described) whereby the traveler progressively moves past the row of bags and whereby at any given moment the traveler is opposite selective ones (a few) of the bags. Within the frame 42 may be provided an air compartment 43 (FIG. 6) which includes a hood 46, adapted to receive the upper end of a flexible conduit 47 (FIG. 1), and a nozzle 41 (FIGS. 2 and 4) in the form of an elongated slit in the air compartment 43. The lower end of the conduit 47 may be connected to another pipe 48 which extends downwardly from a truncated portion 49 of the clean air chamber 16. By this arrangement, atmospheric air may be drawn by sub-atmospheric pressure within the dust-laden chamber 14, into the hood 46 and out the nozzle 41 into the bag 20 to be cleaned, or air under pressure may be supplied through the conduit 47, hood 46, and out nozzle 41 into the bag opposite the nozzle at that moment. In either case, it is desirable for the particular bag 20 opposite the nozzle 41 to be sealed off from the remainder of the clean air chamber 16 so that maximum reverse air will be directed through the bag being cleaned with sufficient suddenness and force so as to flex the bag with a kind of a "snap" rather than being allowed to build-up slowly or to be dissipated by being directed into adjacent bags.

The sealing means of the instant invention includes blade means in the form of a plurality of wiper elements shown generally at 50 (FIG. 2). Each wiper 50 may be held in a corresponding bracket 51 which is formed of two plates 51a and 51b secured to a plate 54, such as by bolts 52. The plate 54 may be mounted by convenient means, such as bolts 56, to a peripheral flange 57 (FIG. 6) which extends about the periphery of the air compartment 43. The plate 54 forms one wall of the air compartment 43 and the plate and associated blade elements 50 may be readily removed as a unit from the air compartment to provide for convenient and rapid removal of the entire sealing assembly for replacement or repair.

The plate 54 has an elongated slot which forms a nozzle 41 to direct air from the air compartment 43 into selective bags 20. The length of the nozzle preferably is less than the length of the open front of each assembled bag 20.

Each wiper 50 preferably has an elongated finger portion 60 which is of sufficient length to project inside a respective bag as the traveler moves from a position wherein the reverse flow of air was directed into solely one bag towards a position where it is to be directed solely into the next bag along the row. Each blade element 50 (FIG. 3) may have a thickened base portion 61 extending about ⅔ of the depth of the blade, with the finger projecting the remaining ⅓, but the arrangement may, if desired, be formed integrally with said finger. Preferably the base portion is formed by a pair of separate back-up strips 61a and 61b disposed on either side of the finger as shown to provide greater flexibility and strength. The base portion 61 preferably has a lesser height as compared to the finger 60 so that the base portion of each blade element is spaced from the fronts of the bags as the traveler moves along the row of bags.

It is preferred that the fingers 60 and their associated base portion 61 are slightly longer than the corresponding lengths of the openings in the assembled bag 20. The top and bottom of each finger 60 may be beveled as shown at 62 in FIG. 3, so as to enter readily into the openings of the bags, during movement of the traveler, and thereby to restrict the flow of air from the nozzle 41 into the bag which is in registration with it. It is preferred that the finger 60 be strong yet have sufficient flexibility that it may bend to slide past the confronting surface portions of the bags as the traveler 40 moves the blade elements 50 into engagement therewith and to have good wear and abrasive characteristics. Preferred materials for the blade finger 60 and its associated back-up strips 61a and 61b are the elastomeric materials such as A085 neoprene, a trade designation of the B. F. Goodrich Company, and Code A357C neoprene nylon, a trade designation of the Goodyear Tire and Rubber Company.

It is preferred that blade elements 50e and 50f be provided on each side of the nozzle opening 41 with such blade elements being spaced apart a distance A which corresponds to the distance between the longitudinal centers of the opposed assembled bags as shown in FIG. 2. It is further preferred that additional blades 50a, 50b, 50c, 50d, 50g, 50h, 50i and 50j be provide and that the spacing between blades 50a, 50b, 50c, 50d and 50e, and between blades 50f, 50g, 50h, 50i, and 50j be a distance B (FIG. 2) which is about one-half of the distance between corresponding points on adjacent bags, although, if desired such spacing may be irregular.

An example of blade dimensions for a bag having a lengthwise aperture of 36 inches is as follows:

Length L (FIG. 6) is 38 inches; width W (FIG. 3) is 3 inches, and thickness T is ⅛ inch.

In accordance with another important feature of the invention the air compartment 43 may be mounted on an improved traveler assembly 40. The assembly may have a frame 42 (FIGS. 5 and 6) composed of a pair of spaced upright members 65a and 65b which are secured at their bottom by a Z-bracket 69 by suitable bolts 70. To the Z-bracket may be attached a pair of wheels 44 (one shown) rotatably mounted as at 44a. The wheels 44 may have annular V-grooves 44b therein adapted to engage the bottom bar 39 for rolling movement thereon.

An upper mounting member 59 may be secured adjacent the upper extremities of uprights 65a and 65 as by bolts 59a. Adjacent each end of the member 59 may be attached an arm 75 (only one shown) pivotally mounted intermediate its ends as at 76 to the mounting member. To one end of each of the arms may be rotatably mounted as at 45a a wheel 45 (only one shown).

To the other end of each of the respective arms may be pivotally mounted a draw rod 77 as at 77a (only one shown). The draw rod extends slidably through a guide block 78 attached to the mounting member 59, and terminates in a cap 79. A resilient means 80 such as a coiled spring is disposed around the rod intermediate the block 78 and the cap 79. By this arrangement the wheel 45 is maintained in resiliently biased coacting rolling engagement with the upper rail 23 whereby the stability and alignment of the wiper blades is better maintained independently of vibrational forces arising from the travel of the assembly along the tracks. In addition such arrangement provides a convenient means for permitting ready installation and removal of the entire traveler 40.

To provide for selective horizontal adjustability of the air compartment 43 with respect to the mounting frame 42 there may be provided adjustable locking assemblies 82 and 84 (FIGS. 6 and 8) disposed inwardly of the mounting member 59 and of the Z-bracket 69. Each assembly comprises spacer bolts 85 and 86 disposed in threaded engagement through cross plates 87 and 88 disposed between the respective uprights 65a and 65b and bears at one end against respective wear plates 89 and 90 mounted on the confronting rear surface of the air compartment 43. Suitable fasteners 91, 92 and 93, 94 such as nuts may threadably be mounted on spacer bolts 85 and 86 on either side of the cross plates 87 and 88. Locking bolts 95 and 96 may be disposed through elongated slots 97 and 98 in the respective cross plates 87 and 88 and through registering apertures in the respective wear plates 89 and 90. Suitable fasteners such as nuts 101 and 102 may be mounted on the bolts 95 and 96 to provide locking thereof. By this arrangement by loosening of the tightening bolts 95 and 96 and tightening of the spacer bolts 85 and 86 or vice versa, selective horizontal adjustment of the air compartment with respect to the frame may be achieved. It is also to be noted that by a disproportionate tightening of spacer bolts 85 and 86 the angle of inclination of the air compartment 43 may be pivotally adjusted about either end.

To provide for selective vertical adjustment of the air compartment with respect to the frame another adjustable locking assembly 105 may be disposed on one of the upright members 65a generally intermediate the ends of the frame 42. Such assembly 105 may comprise a plate 106 extending outwardly from the upright member 65a. A threaded bolt 107 extends slidably through an aperture provided in one end of the plate and through a registered aperture provided in an angle plate fixedly attached to one of the confronting sides of the air compartment. Suitable fasteners 108, 109, and 110 may be threadably mounted on the bolt. By this arrangement, turning movement of nut 108 in one direction permits slidable movement of the bolt to move the air compartment in one direction and turning the nut 108 in the opposite direction permits movement of the air compartment in the reverse direction. The extent of such vertical movement is determined by the aforementioned slots 97 and 98 in the cross plates 87 and 88. By such arrangement selective horizontal, vertical and canting adjustment of the air box may be readily made thereby providing for accurate placement and alignment of the blade means 50 relative to the row of bags with which the blades coact.

The traveler may be propelled along the track by any suitable means such as a chain 143, the ends of which are attached to the traveler frame 42. The chain 143 extends around a driving sprocket 140 (FIG. 1) at one end of the dust collector and is driven by a motor 144 through suitable gearing (not shown) and also around a sprocket 145 at the other end of the dust collector. The motor may be a reversible motor having conventional limit switch or other means to reverse the direction of rotation of the chain, and thus of the traveler, when the traveler has progressed along the lengths of the bags whereby the traveler may continuously and progressively pass up and down the row of bags.

It has been found that improved results are achieved where the novel blade means of the present invention are used in coaction with the novel sealing and fastening means which fastens and seals the confronting front edges of the bags. In such arrangement as shown in FIG. 8, each bag has a pair of side flaps 125 and 126 having reinforcing elements 127a and 127b such as metallic rods, wire or the like about one of which, such as 125 is mounted a resilient sealing and fastening member 128. In assembly the free flap 126 of each bag overlaps a mullion 22 and is loosely held thereon in the desired position by a plurality of mullion pins 127 disposed along the mullions and in registration with corresponding apertures 129 located along the length of the flap 126. The flap 125 of the next adjacent bag 20a overlaps the aforesaid flap 126 of the bag 20b and has a plurality of apertures 130 which receive the aforesaid mullion pins 127. The entire assembly is secured by the spring metal sealing and fastening member 128 which may be fastened as by a hook-like portion 129A crimped at one end about the reinforcing element 127b of flap 125. The fastening and sealing member 128 has a length generally equivalent to the length of each flap 125 and preferably has a substantially flat smooth base portion 132 which is provided with a plurality of spaced apertures 133 (FIG. 9) for registration with the aforesaid mullion pins 127. Such pins preferably project slightly beyond the confronting surface of the base portion.

The fastening and sealing member 128 preferably has an integral resilient leg portion 134 which extends downwardly and generally normal from said base portion 132 and which, in the assembled position, extends into the adjacent bag, such as bag 20a. Such leg portion 134 may terminate in an outwardly and generally flared curved end portion 135 which in assembly holds the adjacent conventional internal bag spacer member, such as 136, in place inside the bag. The aforesaid arrangement provides a firm and effective sealing surface against which each blade 50 coacts to provide the desired seal by engaging the leg portion 134 of each sealing and fastening member 128 in a firm snapping action and then sliding along the base 132 in a wiping engagement and sliding off the base adjacent the back portion 139 adjacent the far end in a snapping action as the traveler 40 moves in one direction across the row of bags. By such arrangement the seal is made and broken in a crisp snapping action, thereby enhancing the suddenness of the commencement and cessation of the rush of reverse flow air into each bag, and resulting in the desired flexing of the bag in a "shaking" action to aid in the dust removal therefrom.

The blades are sealed at the top and bottom by strips 140A and 141A, which are attached in any convenient way to the traveler and which bear against the upper and lower bag retainers 142 and 143A respectively, the latter of which serve to clamp the upper and lower bag flaps 146 and 147 respectively, as well as the mullions 22 to the bars 24 and 27 respectively.

OPERATION

The operation of the novel sealing assembly may best be seen in FIG. 2. As the traveler 40 moves across the row of bags, as from right to left in FIG. 2, blade elements 50e and 50f disposed immediately on either side of the nozzle opening 41 engage bag anchorages 63c and 63d respectively thereby immediately sealing the opening in bag 20c from the openings of the adjacent bags 20b and 20d. As a result, air from nozzle 41 flows with a rush solely into bag 20c thereby creating the sudden flexing or snapping of the bag to assist in the shaking of the dust therefrom. Blades 50a, 50c, 50h and 50j are similarly engaging bag anchorages 63a, 63b, 63e and 63f to assist in the reinforcement of the seal made by blades 50e and 50f. As a result of this reinforcement if there is any air leakage at blades 50e and 50f it is confined in the limited area directly opposite the traveler, thereby maintaining a higher pressure of air in the bag opposite the nozzle 41 than was the case with prior roller devices, wherein any leaks were exposed to the entire air chamber with a consequent loss in pressure. As the traveler moves further to the left, the blades 50e and 50f maintain the seal as they travel along the smooth surfaces of the fastening members 128. As the traveler continues to the left, the blades 50e and 50f slide across the members 128 thereby maintaining the seal of bag 20c until they enter the adjacent bag. The flexibility of the blades results in a quick release and snap action between each blade and bag. The traveler then continues to the left until blades 50e and 50f engage the bag anchorages 63b and 63c whereby the bag 20b is in registration with the nozzle 41. Each bag is thus progressively subjected to the isolated action of the flow of air from the nozzle 41. At the end of the travel, in one direction, the traveler is reversed by well known means and the cycle is then automatically repeated.

I claim:
1. A dust collecting apparatus comprising, a frame mounting a housing including a dust chamber having an inlet means for receiving dust laden air and a clean air chamber having an outlet means for discharging clean air, a dust wall disposed between and separating said chambers from one another, said dust wall including a plurality of flexible, porous filter bags disposed in spaced, side-by-side relationship transversely of said housing, a plurality of generally parallel vertically extending spacer members disposed in said housing and mounting said filter bags, each of said filter bags being opened at one end with said opened ends being disposed in communication with said clean air chamber and extending toward their opposed ends into communication with said dust chamber, motive means for causing dust-laden air to flow from said inlet means toward said outlet means from the outside to the inside of said bags so that dust is deposited on the exterior surfaces of said bags, a traveler mounted within said housing for sequential movement back and forth across said dust wall on the clean air side of said bags, said traveler being movable on trackways supported by said frame and drive means for moving said traveler continuously and progressively back and forth on said trackways along adjacent of the open ends of said bags, said traveler including reverse air flow means to force air into the open ends of the respective bags upon sequential registration of said traveler with each of said bags, said traveler including a traveler frame, a plate member mounted on said traveler frame having an opening therein, a compartment mounted on said traveler frame having an inlet at one end connected to a source of clean pressurized air and communicating at the other end with said opening for directing pressurized air through said opening into said bags, said plate member mounting a plurality of laterally spaced, generally parallel, flexible blade-like wiper elements adapted for flexing engagement with said spacer members upon movement of said traveler transversely of said dust-wall, said wiper elements being of an elongated construction having their lengthwise dimension disposed in generally parallel relation with respect to the lengthwise dimension of said spacer members, said wiper elements—prior to their flexing—extending generally normal to said dust wall and having a widthwise dimension sufficient to extend beyond said spacer members into the interior of said bags so that said wiper elements will resiliently engage the respective spacer members as said traveler moves transversely of said dust wall, said wiper elements including a central pair of wiper elements spaced apart a distance sufficient to isolate a single bag pneumatically from the remaining bags, said central pair of wiper elements disposed on opposite sides of said opening in said plate member for directing reverse-air flow from the traveler into the open end of each of the respective bags when said wiper elements are disposed in sealing engagement with the respective spacer members of a respective one of said bags, and other wiper elements disposed outwardly on opposite sides of said central pair and in engagement with others of said spacer members to restrict air flow generally from said clean air chamber, so that an abrupt snap-action is imparted sequentially to each of the respective bags being cleaned when the respective central pair of wiper elements are disposed in sealing engagement with said spacer members and the opening in said plate member is in sequential registration with the open end of said respective one of said bags, elongated sealing members mounted on said frame adjacent the top and bottom of said traveler and extending transversely of and adjacent the opened ends of said bags, the upper and lower ends of said wiper elements being complementary configured to and disposed in resilient sealing engagement with the respective of said sealing members, and sealing strips disposed outwardly adjacent the opposed upper and lower ends of said wiper elements, in sealing engagement between said traveler and said apparatus frame.

2. A dust collecting apparatus in accordance with claim 1, including selective adjustable means coacting between said traveler frame and said plate for adjusting horizontal, vertical and angular canting positions of said plate with respect to said dust wall.

3. A dust collecting apparatus in accordance with claim 1, wherein said sealing members include inclined portions extending inwardly with respect to the top and bottom of said traveler in a direction toward said bags, and said wiper elements including a complementary configured bevel adjacent their opposed ends for sealing engagement with said inclined portions.

4. A dust collecting apparatus in accordance with claim 1, wherein said sealing strips are mounted on said traveler and disposed in bearing engagement with said sealing members.

References Cited

UNITED STATES PATENTS

| | | | |
|---|---|---|---|
| 861,566 | 7/1907 | Wiki | 137—525.5 X |
| 1,022,157 | 4/1912 | Scott | 137—525.5 |
| 1,830,097 | 11/1931 | Dollinger | 55—294 |
| 1,868,876 | 7/1932 | Boesger | 55—341 X |
| 2,154,719 | 4/1939 | Berry | 210—402 X |
| 2,407,722 | 9/1946 | Peterson | 55—285 |
| 2,541,694 | 2/1951 | Galson | 55—390 X |
| 2,695,681 | 11/1954 | Boesger | 55—341 X |
| 2,722,997 | 11/1955 | Turner | 55—291 |
| 2,732,912 | 1/1956 | Young | 55—293 X |
| 2,765,048 | 10/1956 | Hersey | 55—283 X |
| 2,867,289 | 1/1959 | Sare | 55—350 X |
| 2,906,371 | 9/1959 | Jones | 55—294 X |
| 2,938,598 | 5/1960 | Jones et al. | 55—341 X |
| 3,097,939 | 7/1963 | Schneider et al. | 55—304 X |
| 3,176,449 | 4/1965 | Schultz et al. | 55—294 |
| 3,235,064 | 2/1966 | Frost | 137—525.3 X |
| 3,251,175 | 5/1966 | Black | 55/294 |
| 954,541 | 4/1910 | Raymond et al. | 15—401 |
| 1,659,496 | 2/1928 | Oishei et al. | |
| 2,610,351 | 9/1952 | Lilly | 15—401 |
| 2,641,789 | 6/1953 | Rappl | 15—250.42 |
| 3,002,209 | 10/1961 | McKinstry | 15—245 X |
| 3,116,510 | 1/1964 | Oishei et al. | 15—250.42 |
| 3,239,061 | 3/1966 | Horning et al. | 210—273 X |

FOREIGN PATENTS 622,370   5/1949   Great Britain.

HARRY B. THORNTON, Primary Examiner

DENNIS E. TALBERT, Assistant Examiner

U.S. Cl. X.R.

15—250.42, 401; 16—18; 55—302, 358, 341, 379, 381